Dec. 10, 1957  F. COETERIER  2,816,245
DEVICE FOR PRODUCING ULTRA-SHORT WAVES
Filed May 16, 1952  2 Sheets-Sheet 1

INVENTOR
Frederik Coeterier
BY
AGENT

Dec. 10, 1957  F. COETERIER  2,816,245
DEVICE FOR PRODUCING ULTRA-SHORT WAVES
Filed May 16, 1952  2 Sheets-Sheet 2

INVENTOR
Frederik Coeterier
BY
AGENT

United States Patent Office 2,816,245
Patented Dec. 10, 1957

2,816,245

DEVICE FOR PRODUCING ULTRA-SHORT WAVES

Frederik Coeterier, Eindhoven, Netherlands, assignor, by mesne assignments, to North American Philips Company, Inc., New York, N. Y., a corporation of Delaware Application May 16, 1952, Serial No. 288,279

Claims priority, application Netherlands May 29, 1951

14 Claims. (Cl. 315—5.21)

The invention relates to devices for producing ultra-short waves, more particularly centimetre waves or decimetre waves, in which use is made of a velocity-modulation tube incorporating at least one resonator, e. g. a cavity. Such a tube exhibits a beam-shaped electron current which passes through apertures or a resonator incorporated in the tube and of which the velocity is thus modulated. After the velocity modulation has been converted into intensity modulation the electron beam gives up its energy to the same resonator or to another resonator. The arrangement of the cavity resonator or resonators or at least part thereof inside the envelope of the discharge tube permits of obviating the detrimental effect of the supply-conductors which would, in general, be required with the use of resonators arranged wholly externally of the tube, and thus higher frequencies can be produced The invention has for its object to provide a device using a tube enclosing at least one resonator in which the frequency of the oscillations produced is adjustable within certain limits in a simple manner without the need of having access to the said resonator or resonators.

According to the invention, in addition to the resonator or resonators coacting with the electron beam and enclosed within the tube, provision is made of a resonator which is coupled with the first-mentioned resonator or resonators and is in part located outside the envelope of the discharge tube, this external part being adjustable relative to the remainder of the device for the purpose of varying the generated frequency.

The invention may be used with a device for producing ultra-short waves in which only one cavity resonator is incorporated within the tube, as is the case with the known tubes using a concentrated electron beam which passes through apertures in the wall of the resonator and is thus velocity modulated, after which it is resupplied to the control system by a reflection electrode of suitable shape. The velocity modulation of the electron beam is converted into intensity modulation upon reflection, so that the energy of the beam can be given up to the control system. In this case the cavity resonator housed inside the tube may comprise two quarter-wavelength conductors arranged side by side and surrounded by a conductive screen, which is coupled capacitatively by way of the tube envelope with a slidable member arranged externally of the tube.

The invention is of particular importance for devices comprising a discharge tube in which the beam traverses in succession two cavity resonators, the velocity of the beam being varied in the first and the beam giving up its energy after the velocity modulation has been converted into intensity modulation. In this case a single resonator coupled with the said two cavity resonators may be used for adjustment.

The resonator used for the adjustment is preferably in the form of a cylinder and comprises two telescopic, relatively movable parts, which are separated from one another by the glass wall of the discharge tube.

A suitable manner of obtaining the coupling is to provide gaps side by side where current maxima occur in the wall of the resonator, these gaps varying the frequency and communicating each with a different resonator.

In order that the invention may be more clearly understood and readily carried into effect, it will now be described more fully with reference to the accompanying drawings, wherein.

Figure 1:
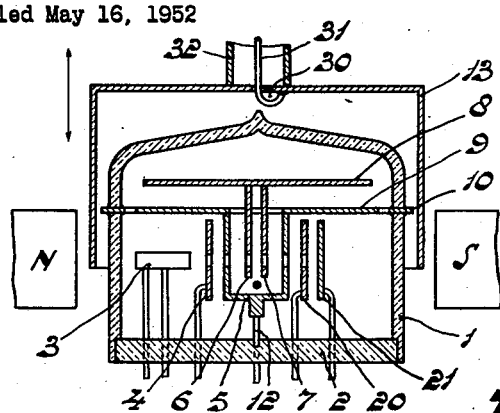
Fig. 1 is a sectional view taken on the axis of the discharge tube of a first embodiment of the invention.
Figure 2:
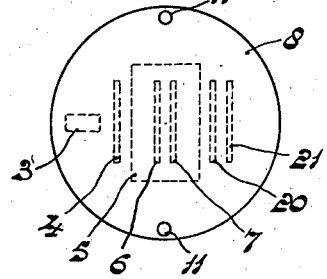
Fig. 2 is a plan view thereof.

Referring to Figs. 1 and 2, reference numeral 1 designates the cylindrical glass envelope of the discharge tube used in the device; 2 designates the glass base thereof, in which the electrode pins are secured. The tube comprises a gun 3 providing an electron beam which is limited by the perforated flat diaphragm electrode 4 and which is directed at right angles to the axis of the tube. The beam passes through a resonator 5 constituted by a cavity bounded laterally by four flat metal walls and containing conductive flat strips 6 and 7. A metal plate 9, having a rectangular aperture communicating with the resonator 5, is secured to the upper edges of the said walls. On the lower side, the resonator 5 is closed by a metal bottom. The unit is supported by a supporting lead member 12, secured to the said bottom and the base 2. Two opposite walls of the resonator 5 and the strips 6 and 7 are provided with aligned apertures to allow the electron beam to pass.

After traversing the resonator the beam is reflected by an electrode assembly constituted by a perforated electrode 20 and a flat unperforated electrode 21. The electrode 20 is preferably at cathode potential, whereas the potential of the electrode 21 is negative relative to that of the cathode. Provision is made of a permanent magnet system N–S, the lines of force of which extend approximately parallel to the path of the electrons, so that a satisfactory concentration of the electrons of the beam is maintained, even after they have been reflected by the system 20, 21.

The strips 6 and 7 are a quarter-wavelength long and are conductively secured to a flat, circular metal disc 8. Supporting members 11 for the plate 8 are provided between the plates 8 and 9. The walls of the resonator 5 and the plates 8 and 9 have a positive voltage relative to the cathode. The electrons are modulated in velocity upon passing through the gap between the left-hand wall of the resonator 5 and the strip 6; during the subsequent travel of the electrons, and more particularly during the reflection produced by the system 20, 21, this velocity modulation is converted into intensity modulation. The intensity-modulated, reflected beam gives up energy in the gap between the strip 7 and the right-hand wall of the resonator 5. The frequency of the oscillations is primarily determined by the length of these conductors 6 and 7 and for this reason they are approximately a quarter-wavelength long. Part of the energy of the electron beam may furthermore be given up in the gap between the strip 6 and the left-hand wall of the resonator to the latter, when the electrons pass through this gap for the second time.

The oscillations are transmitted to the space between the plates 8 and 9, which operates as an open cavity resonator and in which oscillations of the $TE_{1,1}$ mode are produced. The supporting members 11 for the plate 8 are secured to the periphery thereof at diametrically opposite points, where the oscillation amplitude of the electrical field is equal to zero (Fig. 2).

The cavity resonator between the plates 8 and 9 is coupled with a resonating space which is partly located outside the tube and which is formed by the plate 8 and an open ended cylinder or cup 13, which is slidable over the tube in the direction of the axis thereof. In this resonating space oscillations of the $TM_{1,1}$ mode are produced. Coupling between the cylinder 13 and the plate 9 is provided by a conductive ring 10 sealed in the wall of the tube.

The cylinder 13 is provided with adjusting members, not shown, by means of which it may be displaced over the tube wall to a greater or smaller extent. This displacement controls the frequency produced within certain limits. The cylinder 13 may at the same time serve as the supply point for the oscillation energy. In the embodiment shown it therefore houses a wire loop 30, which is connected to the internal conductor 31 of a concentric line, the external conductor of which is constituted by a cylinder 32.

Figure 3:
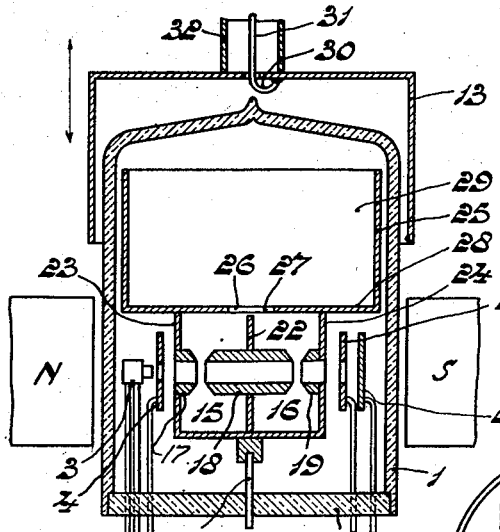
Figs. 3 and 4 are a sectional view and a plan view respectively of a second embodiment.
Figure 4:
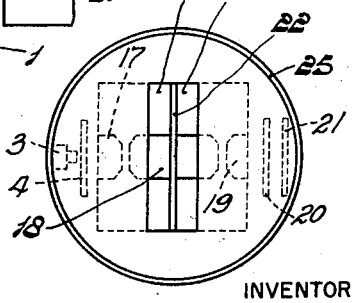

In the embodiment shown in Figs. 3 and 4 the electron beam traverses apertures in the walls 22, 23 and 24 of two resonant cavities 15 and 16, after which it is reflected by a reflection system similar to that of the first embodiment. The wall 22 is the separating wall between the spaces 15 and 16.

The apertures of the cavity resonators 15 and 16 through which the electrons pass are defined by conductive, tubular members 17, 18 and 19, which surround the electron beam and which are arranged and shaped such that comparatively narrow gaps are left between their adjacent ends. If it is assumed that the cavity resonator 15 is electrically oscillating in a manner such that a definite alternating voltage prevails between the ends of the members 17 and 18, this voltage will have a control effect on the electrons of the beam, so that the velocity of the beam is modulated. During the travel of the electrons through the member 18, the length of which is comparatively great with respect to that of the members 17 and 19, the velocity modulation is more or less converted into intensity modulation owing to the drift effect. A second control takes place between the ends of the members 18 and 19 in the second cavity resonator 16, which is also assumed to be oscillating.

Under certain conditions a substantial part of the energy of the beam may be given off to the second cavity resonator upon first traverse of the gap between the members 18 and 19. However, it is more advantageous to choose the voltages so that the transfer of energy to the second cavity resonator 16 takes place primarily after the concentrated electron current has been reflected by the electrodes 20 and 21 and passes from the right to the left through the gap between the members 18 and 19. This current will then pass through the gap between the members 17 and 18 for the second time and may then give off energy to the cavity resonator 15. A further transfer of energy may take place after the electrons have been reflected by the electrode 4 and traverse the cavities 15 and 16 for the third time. After a few reciprocations the electrons will finally strike the members 17, 18 and 19, which are at a positive potential with respect to the cathode 3, as are the walls of the cavity resonators 15 and 16. The oscillation is maintained, since there is coupling between the cavity resonators 15 and 16.

The cavity resonators 15 and 16 may have very different shapes. In the plan shown in Fig. 4 the sectional area at right angles to the axis of the tube is rectangular; with the embodiment shown in Fig. 5 this sectional area is circular, see broken line 35. In the first case the cavity resonators have a prismatic shape and in the second case they are in the form of vertical half cylinders.

Provision is made of a third cavity resonator 29, as shown in Fig. 3, the wall of which comprises two portions 25 and 13. The portion 25 is housed inside the tube and the portion 13 is external of the tube. The two portions are preferably cylindrical, the portion 13 being adapted to move over the portion 25 in telescope fashion. These portions are separated from one another by the wall 1 of the tube. The portion 25 is provided with a bottom 28, which constitutes at the same time a common wall with the two cavity resonators 15 and 16. In order to provide optimum closure of the cavity resonator, a conductive ring may be sealed in the glass wall 1 as at 10 in the embodiment shown in Fig. 1. As an alternative, the cylindrical portion 25 may, in certain cases, be omitted or, at least, be made very low.

Figure 5:
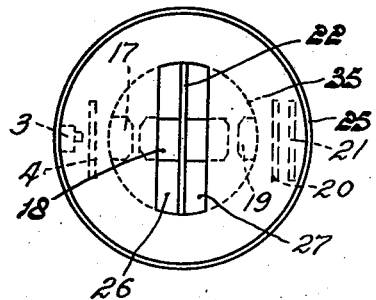
Fig. 5 is a plan view of a modification of Figs. 3 and 4.

By means of a rectangular aperture in the bottom wall 28, which aperture forms gaps 26 and 27 with respect to the common wall 22, the resonator 29 is coupled with the two cavity resonators 15 and 16. These gaps are located at the portion of the common wall 22 of these two cavity resonators and extend, as shown in Figs. 4 and 5, parallel to this wall 22. The vector of the magnetic field produced in the cavity resonator extends parallel to the gaps at the position thereof, i. e. at right angles to the plane of the drawing. The coupling between the cavity resonators 15 and 16 and the resonator 29 is, consequently, primarily magnetic. The gaps are provided at the position of a current maximum in the wall of the resonator 29.

The three spaces 15, 16 and 29 are thus intercoupled comparatively strongly at the position of three current maxima by means of three series gaps, if the space 29 oscillates approximately in the mode $TM_{1,1}$. The two first of these three gaps are the gaps 26 and 27, mentioned above, providing a coupling between the space 29 and the space 15, 16 respectively. The third space is that between the top end of the wall 22 and the bottom surface of the space 29; it is found to be most suitable to make this gap narrow with respect to the gaps 26 and 27, so that the wall 22 extends nearly to the bottom surface of the space 29 at the position of the gaps.

It has been found that, with a device as shown in Figs. 3 and 4, a frequency adjusting range of 10% may be obtained with a wavelength of 5 cms., without notable change of the output. The principal dimensions of the various parts were, in one instance successfully tested at this wavelength, as follows:

Resonators 15 and 16: width 9 mms., length 23 mms., height 23 mms.

Cylinder 25: diameter 38 mms., height 16 mms.

Cylinder 13: diameter 43 mms., height 50 mms.

The length of the gaps 26 and 27 was 20 mms., the width 4 mms.

The width is to be understood to be the dimension in the direction of the electron beam and the height the dimension in the direction of the axis of the tube.

Figure 6:
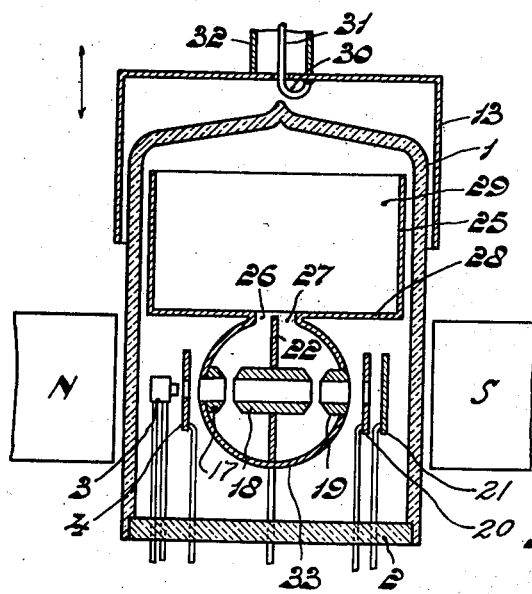
Figs. 6 and 7 are a sectional view and a plan view respectively of a fourth embodiment.
Figure 7:
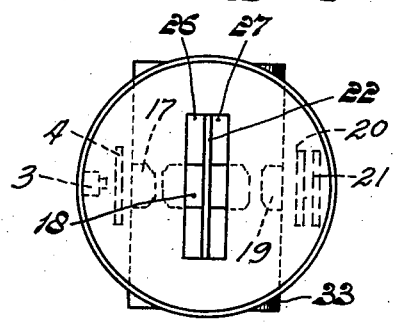

Figs. 6 and 7 show an embodiment which is similar to that of Figs. 3 and 4 except that the cavity resonators 15 and 16 are shaped in the form of horizontal half cylinders, their axes being at right angles to the electron path and to the axis of the tube.

The embodiments shown in Figs. 3 to 7 have the advantage over that shown in Figs. 1 and 2 that the dimensions of the frequency controlling resonant cavity may be larger by a factor of 3 to 4 for the same generated frequency. This is of importance with the production of oscillations of very short wavelength; the dimensions being equal, the embodiments shown in Figs. 3 to 7 permit of producing oscillations having a shorter wavelength than the embodiment shown in Figs. 1 and 2.

What I claim is:

1. A device for producing ultra-short waves comprising an electric discharge tube having a first cavity resonator for velocity modulating a beam-shaped electron current and a second cavity resonator energized by said velocity modulated current, and a single common cavity resonator of the hollow type coupled individually with said first and second resonators to stabilize said ultra-short waves.

2. A device, as set forth in claim 1, wherein said resonators have walls having at least one gap at positions where current maxima occur for inter-coupling said resonators, said coupling being a magnetic coupling provided by said gaps.

3. A device, as set forth in claim 2, wherein said gaps are arranged side by side in a wall of said common cavity resonator, each of said gaps communicating with a different one of said cavity resonators.

4. A device, as set forth in claim 1, wherein said tube comprises a gas-impervious envelope and wherein said common cavity resonator is in part located outside said envelope, the external part being adjustable with respect to the remainder of said common cavity resonator to vary the generated frequency of said ultra-short waves.

5. A device, as set forth in claim 4, wherein said common cavity resonator has a cylindrical form and comprises two portions slidable with respect to one another and separated by the envelope of said tube.

6. A device for producing ultra-short waves comprising an electric discharge tube having beam-shaped electron current producing means, a first cavity resonator for velocity modulating said current, a second cavity resonator, means for reflecting the velocity modulated current, said second resonator being energized by said reflected velocity modulated current, and a single common cavity resonator of the hollow type coupled individually with said first and second resonators to stabilize said ultra-short waves.

7. A device, as set forth in claim 7, wherein said first and second resonators are shaped in the form of a prism and have a common wall.

8. A device, as set forth in claim 6, wherein said first and second resonators are shaped in the form of half-cylinders arranged with their flat sides against one another.

9. A device, as set forth in claim 8, wherein the axis of the cylinder formed by said first and second resonators jointly coincides with the axis of said common cavity resonator.

10. A device, as set forth in claim 8, wherein the axis of the cylinder formed by the two resonators jointly is at right angles to the axis of said common cavity resonator.

11. A device for producing ultra-short waves comprising an electric discharge tube having beam-shaped electron current producing means, a first cavity resonator for velocity modulating said current, a second cavity resonator energized by said velocity modulated current, and a common cavity resonator coupled with said first and second resonators to vary the generated frequency of said ultra-short waves, said common cavity resonator being in part located without said tube, the external part being adjustable with respect to the remainder of said device, said resonators having walls having at least one gap at positions where current maxima occur for magnetically coupling said resonators, said gaps being arranged side-by-side in a wall of said common cavity resonator, each of said gaps communicating with a different one of said first and second cavity resonators, said first and second resonators having a first common wall, said first, second and common resonators having a second common wall adjoining said first common wall, said gaps being approximately parallel to said first common wall and being located where said first common wall adjoins said second common wall.

12. A device, as set forth in claim 11, wherein said gaps are separated by said first common wall and wherein said first common wall extends approximately to the surface of the bottom of said common cavity resonator at the position of said gaps.

13. A device, as set forth in claim 12, wherein said gaps are provided at the position of the center of the sectional area of said common cavity resonator.

14. An electrical resonating system comprising three mutually coupled cavity resonators of the hollow type contained within electrically conductive walls, two of said resonators being mutually adjacent on one side of a common one of said walls, means including a velocity-modulated electron beam for coupling said two resonators, the remaining one of said resonators being on the other side of said common wall and lying over the point of said mutual adjacency, and a pair of mutually adjacent gaps in said common wall individually communicating said two resonators with said remaining resonator.

References Cited in the file of this patent

UNITED STATES PATENTS

| | | |
|---|---|---|
| 2,222,898 | Fraenckel | Nov. 26, 1940 |
| 2,342,897 | Goldstine | Feb. 29, 1944 |
| 2,394,397 | Mouromtseff et al. | Feb. 5, 1946 |
| 2,400,752 | Haeff | May 21, 1946 |
| 2,406,370 | Hansen | Aug. 27, 1946 |
| 2,407,974 | Clifford et al. | Sept. 24, 1946 |
| 2,410,109 | Schelleng | Oct. 29, 1946 |
| 2,436,398 | Morton | Feb. 24, 1948 |
| 2,470,802 | Braden | May 24, 1949 |
| 2,527,600 | Touraton et al. | Oct. 31, 1950 |
| 2,589,903 | Vitter | Mar. 18, 1952 |